(12) United States Patent
Okamoto et al.

(10) Patent No.: US 6,501,708 B2
(45) Date of Patent: Dec. 31, 2002

(54) DISK DRIVE APPARATUS (75) Inventors: Morihiro Okamoto, Kawagoe (JP); Joichi Oyama, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/801,877

(22) Filed: Mar. 9, 2001

(65) Prior Publication Data
US 2001/0055246 A1 Dec. 27, 2001

(30) Foreign Application Priority Data

Mar. 16, 2000 (JP) ........................... 2000-074067

(51) Int. Cl.⁷ .............................. G11B 7/00; G11B 3/90
(52) U.S. Cl. ................... 369/30.16; 369/53.24
(58) Field of Search ............... 369/53.24, 30.16

(56) References Cited

U.S. PATENT DOCUMENTS 4,689,778 A * 8/1987 Miura et al. ............ 369/53.24
5,546,365 A * 8/1996 Roth ................... 369/275.3 X
5,920,526 A * 7/1999 Udagawa ............. 369/53.24

\* cited by examiner

*Primary Examiner*—Aristotelis M. Psitos
(74) *Attorney, Agent, or Firm*—Morgan, Lewis & Bockius LLP (57) ABSTRACT

Disclosed is a disk drive apparatus which has a manual search function with improved operability. Upon manual search for information TNO(n+1) recorded on the outer periphery of a information write/read medium to information TNO(n) recorded on the inner periphery, there may be an gap (no sound) portion in the information between the outer and inner peripheries. In this case, the information is searched by the front-end position Pb on the outer periphery. Thereafter, no search is performed on the gap (no sound) portion through skipping from the front-end position Pb to the terminal end position Pc of the information TNO(n). Thus, only necessary information is continuously searched upon the manual search without searching the gap (no sound) portion which is not necessary for the user. Thus, the user is provided with improved operability.

16 Claims, 6 Drawing Sheets

DISK DRIVE APPARATUS

BACKGROUND OF THE INVENTION

1. Field of the Invention

The present invention relates to a disk drive apparatus for reading information from information read/write media such as CD-R disks.

2. Description of Related Art

In recent years, variations of the CD family based on the CDDA (Compact Disk Digital Audio) system have increased and, among all, the CD-R disk has gained attention.

The CD-R disk has a storage layer formed of organic coloring matter and is adapted such that information can be written thereon once and for all. For this reason, the CD-R disk has been receiving attention as an information read/write medium suitable for writing data, for example, image data, audio data, and data such as computer programs, as desired by a user, for long-term storage.

The CD-R disk is also adapted to be compatible with the CD family. Thus, after finalizing processing has been performed on the data written on CD-R disk with the CD-R recorder, the data can be read from the CD-R disk with a CD player in the same manner as by the CDDA method.

However, as described above, the CD-R has an advantage in that information can be written thereon although once only. Thus, for example, suppose that the user has recorded a plurality of tunes with the CD-R recorder and may not desire to read any particular one of the tunes. Even in this case, the user is not allowed to overwrite the tune.

In this context, as a CD-R recorder that can meet the requirements of such a user, a device has been developed which allows address information, having tune data that is not necessary for being read, to be written onto a TOC (Table of Contents). When the CD-R disk on which finalizing processing has been performed is read with a CD player, this apparatus allows only a tune desired by the user to be read without reading the aforementioned specified tune data by protecting the tune data from being read, thereby providing increased operability.

Figure 1:
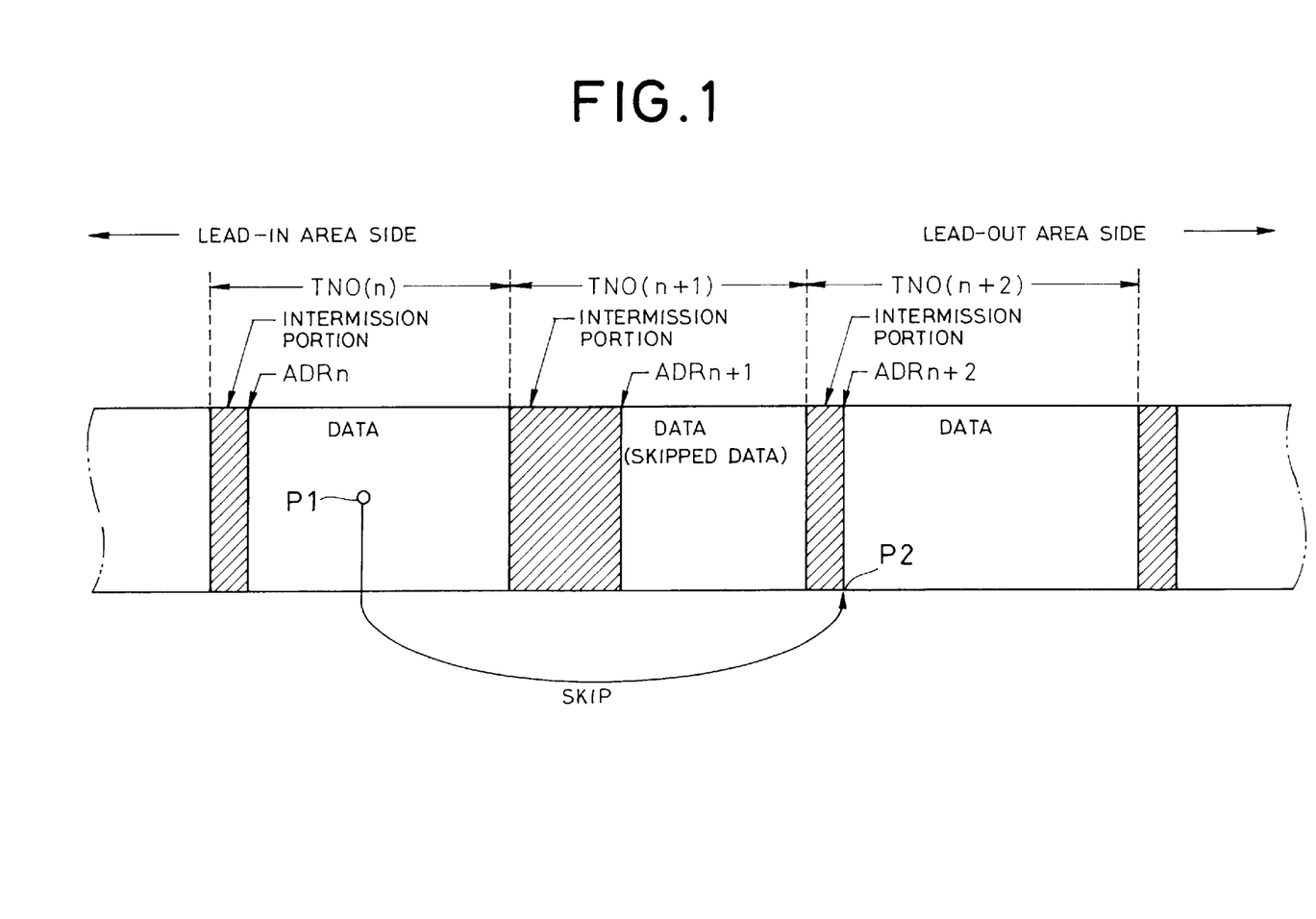
FIG. 1 is an explanatory view illustrating a problem of a conventional read player.

For example, as schematically shown in FIG. 1, suppose that the user writes three pieces of tune data TNO(n) to TNO(n+2) and then performs the aforementioned finalizing processing designating that the second tune data TNO(n+1) is not to be read. Suppose also that a command for requesting the reading of the next tune (referred to as "track search") is entered in the course of reading the first tune TNO(n) from the CD-R disk on which the finalizing processing has been performed with the CD player. In this case, a jump is made from an address P1 being read to a head address ADRn+2 of the third tune data TNO(n+2) to continue the reading.

Thus, the jump is made to the head address ADRn+2, controlled by TOC, where the tune is actually written (rather than to the start address of the gap (with no sound) area in the figure). This allows the second tune data TNO(n+1) which need not be read to be skipped so as to perform reading continuously, thereby providing improved operability.

Some CD-R recorders are also known which have a function of designating data corresponding to a writing error as read-protected data upon being read with a CD player. This is achieved by writing address information including the data corresponding to the writing error onto the TOC when the writing error has occurred during writing of the information.

For example, suppose the second tune data TNO(n+1) shown in FIG. 1 corresponds to the writing error. In this case, the CD player completely reads the first tune data TNO(n) to continue reading from the head address ADRn+2 of the third tune data TNO(n+2). That is, the second tune data TNO(n+1) is automatically skipped and the head address ADRn+2 where the third tune data TNO(n+1) is actually recorded is subsequently read. This allows continuous reading, thereby providing improved operability.

Incidentally, as described above, in order to improve user operability, the CD player is provided with a function referred to as manual search in addition to the track search.

This manual search is a function allowing a search for a read start position desired by the user while reading tune data on fast forward, unlike a function of the track search which switches targets to be read successively for each of the tunes.

Figure 2:
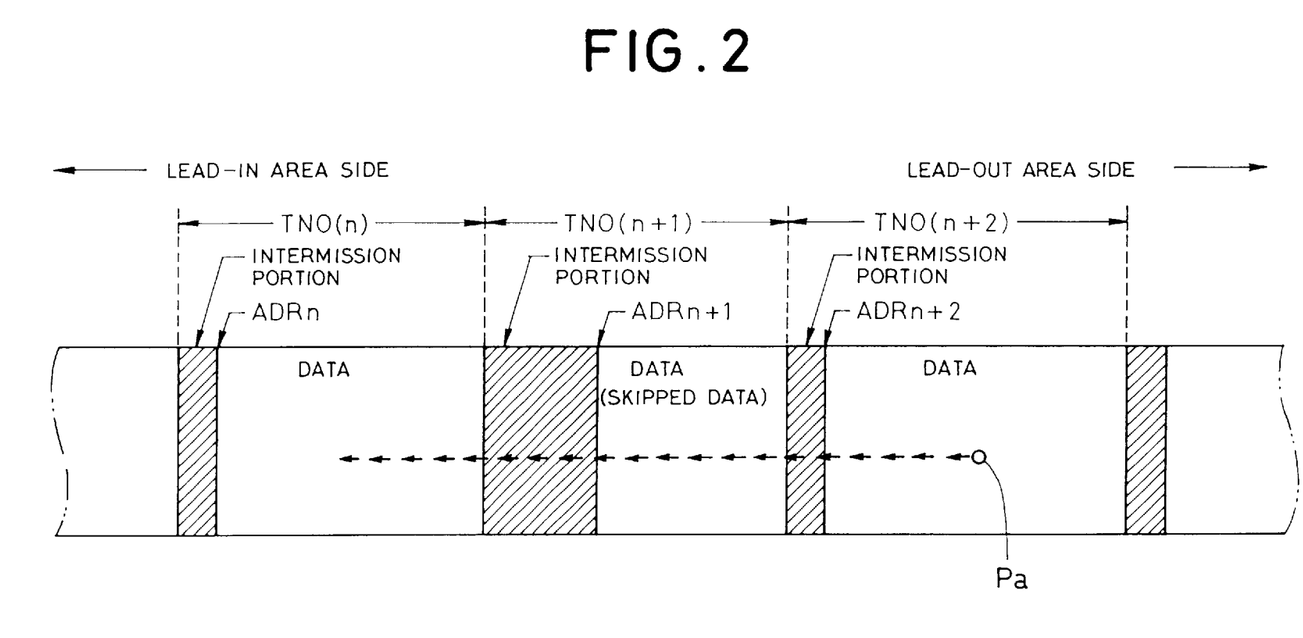
FIG. 2 is an explanatory view further illustrating a problem of the conventional read player.

For example, as schematically shown in FIG. 2, suppose that in the course of reading the tune data TNO(n+2), the user instructs the manual search to search for a desired read start position while performing what is called fast-reverse. In this case, the pickup of the CD player reverses from an address Pa being read in the direction indicated by the arrows (toward the lead-in area). At the same time, the pickup moves toward the smaller numbers or the tune data TNO(n+1), TNO(n), and so on while partly reading the tune data, while the instruction of the manual search is in effect.

For this reason, with the manual search, the user can perform fast reverse feeding up to a desired position with an operation that feels like an analog cassette tape, so that the reading can be started from the fast-reversed position.

However, the conventional manual search has a problem that data designated not to be read by the user and read-protected data corresponding to a writing error (e.g. the second tune data TNO(n+1), etc. in FIG. 2) are also read as targets to be searched.

For this reason, the manual search takes a long time to search for a read start position desired by the user and takes even an gap (no sound) area where no tune is actually written as a target to be searched. Consequently, the manual search has a problem of requiring an unnecessary operation by the user.

The present invention was developed to overcome the conventional problems mentioned above, and an object of the present invention is to provide a disk drive apparatus having search functions for improving the operability.

A disk drive apparatus according to a first aspect of the present invention for achieving the aforementioned object is a disk drive apparatus having a manual search function. The apparatus is characterized by comprising a detecting means for detecting a front end position of information subsequent to a terminal end position of an gap portion contained in information upon manual search of said information recorded on an information read/write medium from the outer to inner periphery. The apparatus also comprises a searching means for searching for a terminal end position of information recorded on said inner periphery across said gap portion. The apparatus further comprises a control means for skipping said gap portion to move a pickup to said terminal end position to be searched for by said searching means when said detecting means detects said front end position.

By means of this construction, when a manual search is carried out from the information recorded on the outer periphery of the information read/write medium to the information recorded at the inner periphery of the information read/write medium in the case where gap portion exists in the information between the aforementioned outer periphery and inner periphery, after a search is carried out as far as the front end position of the information at the outer periphery a search of the gap portion is not carried out due the search from this front end position to the information of the inner periphery at the end position being skipped. Thus, only necessary information is continuously searched upon the manual search without searching the gap (no sound) portion which is not necessary for the user. Thus, the user is provided with improved operability.

In addition, the disk drive apparatus according to a second aspect of the present invention has a manual search function. The apparatus is characterized by comprising a detecting means for detecting a front end position of information subsequent to a terminal end position of read-protected information contained in information upon manual search of said information recorded on an information read/write medium from an outer to inner periphery. The apparatus also comprises a searching means for searching for a terminal end position of information recorded on said inner periphery across said read-protected information. The apparatus further comprises a control means for skipping said read-protected information to move a pickup to said terminal end position to be searched for by said searching means when said detecting means detects said front end position.

By means of this construction, when a manual search is carried out from the information recorded on the outer periphery of the information read/write medium to the information recorded at the inner periphery of the information read/write medium in the case where read-protected information exists in the information between the aforementioned outer periphery and inner periphery, after a search is carried out as far as the front end position of the information at the outer periphery a search of the read-protected information is not carried out due the search from this front end position to the information of the inner periphery at the end position being skipped. Thus, only necessary information is continuously searched upon the manual search without searching the read-protected information which is not necessary for the user. Thus, the user is provided with improved operability.

DETAILED DESCRIPTION OF PREFERRED EMBODIMENTS

Figure 3:
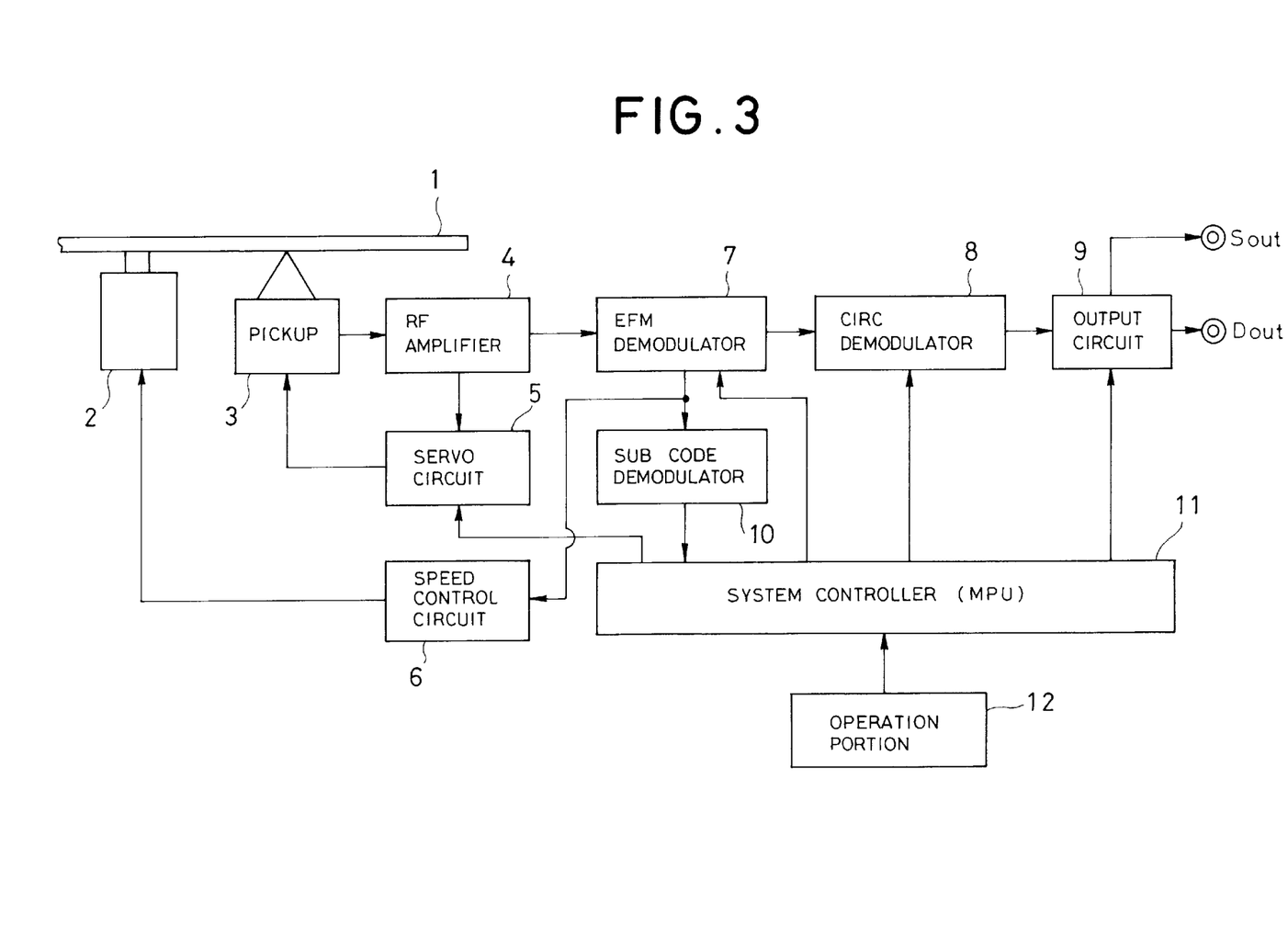
FIG. 3 is a block diagram illustrating the configuration of a disk drive apparatus according to an embodiment of the present invention.
Figure 4:
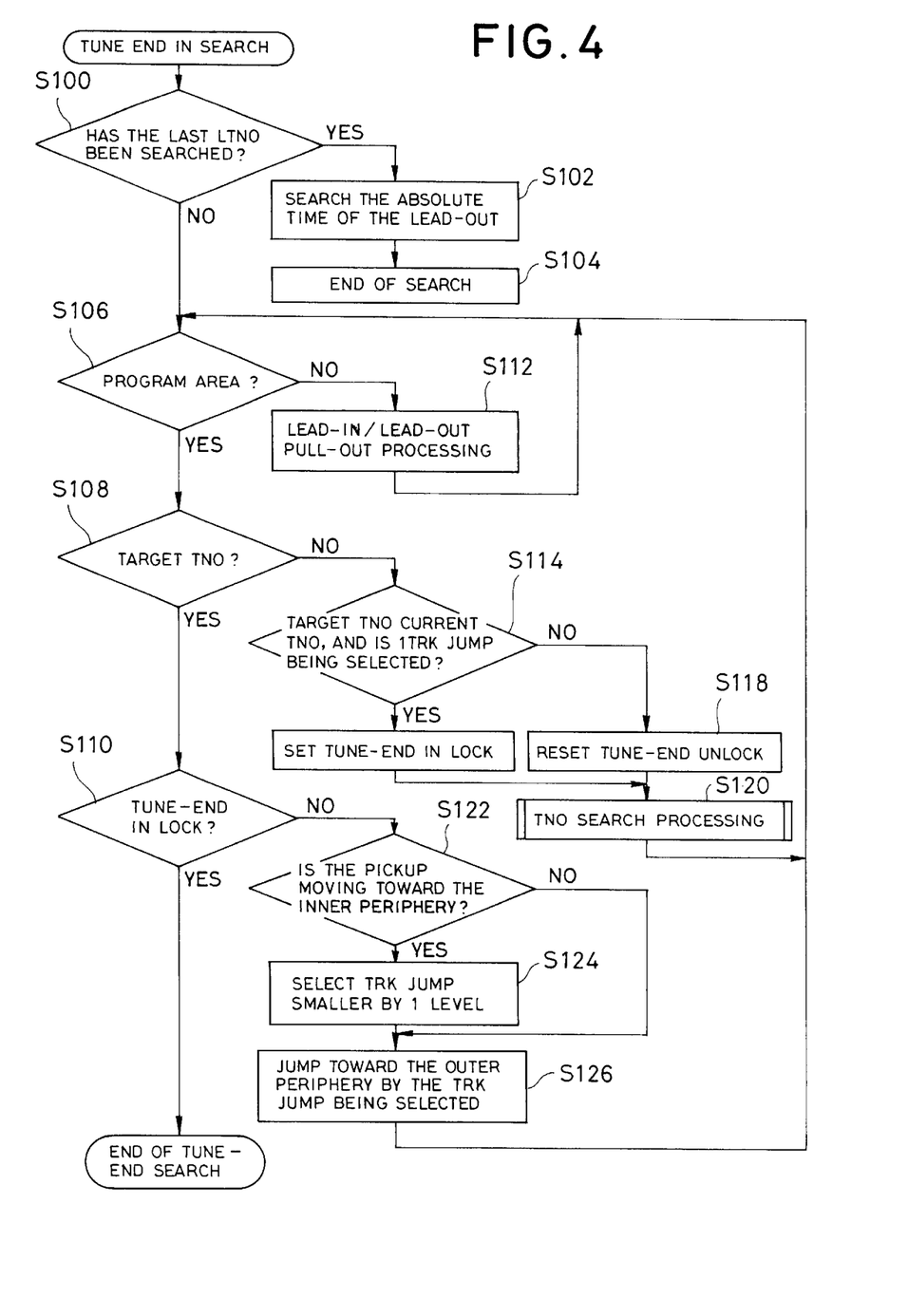
FIG. 4 is a flowchart illustrating the operation of the disk drive apparatus according to an embodiment of the present invention.
Figure 5:
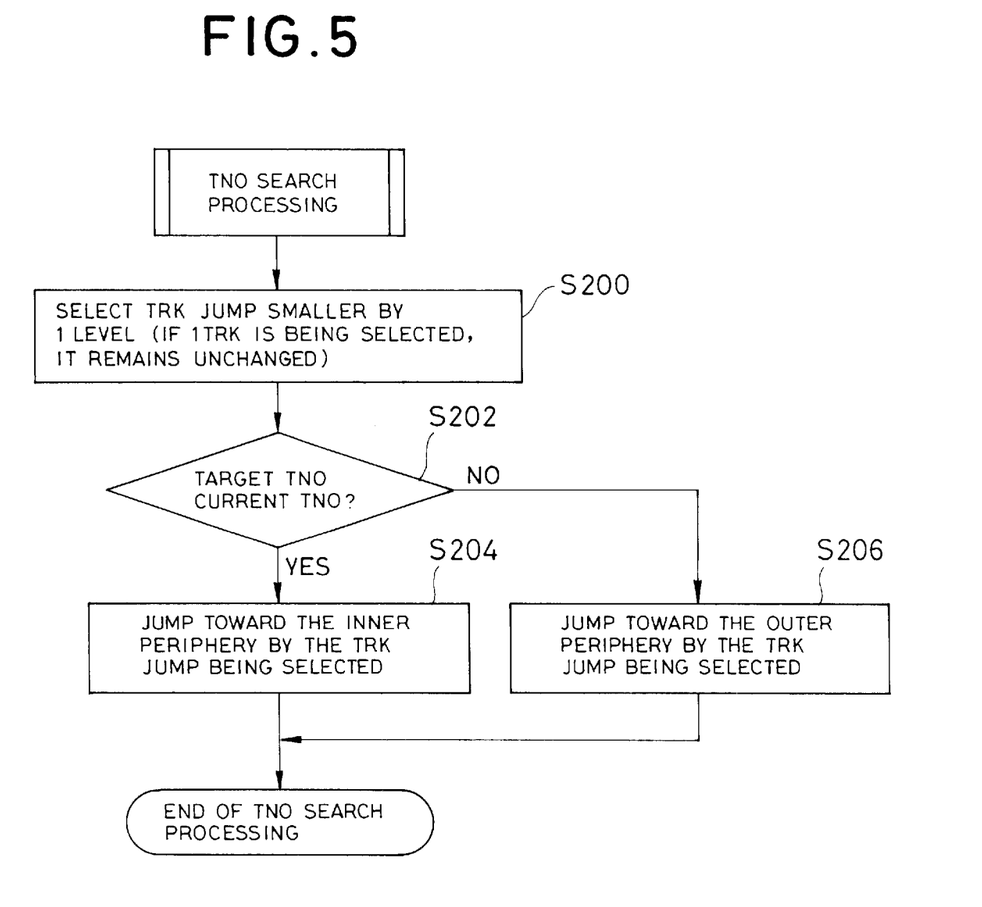
FIG. 5 is a flowchart further illustrating the operation of the disk drive apparatus according to an embodiment of the present invention.

Embodiments of a disk drive apparatus of the present invention will be described below with reference to the drawings. Incidentally, FIG. 3 is a block diagram illustrating the configuration of a disk drive apparatus according to an embodiment of the present invention. FIGS. 4 and 5 are flowcharts illustrating the operation of the disk drive apparatus according to the embodiment of the present invention.

Referring to FIG. 3, the disk drive apparatus is adapted to read a disk 1 of the CD family that is an information read/write medium. The disk drive apparatus is provided with a spindle motor 2 for rotating the disk 1 at a clamped position and a pickup 3 for reading information optically.

In addition, the disk drive apparatus is provided with an RF amplifier 4 for amplifying signals read by the pickup 3 and performing matrix processing on the signals. The apparatus is also provided with a servo circuit 5 for performing focus servo, tracking servo, and thread servo on the pickup 3 in accordance with the output signal from the RF amplifier 4. The apparatus further comprises a speed control circuit 6 for controlling the rotational speed of the spindle motor 3 at a predetermined liner speed in accordance with the data demodulated by a EFM demodulator 7.

The aforementioned EFM demodulator 7 demodulates the output signals (RF signals) from the RF amplifier 4 into EFM (Eight-to Fourteen-Modulation) signals. A CIRC demodulator 8 performs CIRC (Cross Interleaved Reed Solomon Code) code error correction on the demodulated data and outputs the resulting data to an output circuit 9.

The output circuit 9 converts the output data from the CIRC demodulator 8 to an analog signal Sout by a built-in D/A converter and outputs the resulting signal. Alternatively, the output circuit 9 outputs the output data from the CIRC demodulator 8 as the digital data Dout as it is.

In addition, the disk drive apparatus is provided with a sub-code demodulator 10 for demodulating sub-coding data in the demodulated data outputted from the aforementioned EFM demodulator 7 and supplying the resulting data to a system controller 11.

The system controller 11 has a microprocessor unit (MPU). The system controller 11 controls the operation of the entire disk drive apparatus as well as controlling the manual search, described later, in accordance with the sub-coding data from the sub-code demodulator 10.

The disk drive apparatus is also provided with an operation portion 12 that allows a user to input desired commands to the system controller 11.

Incidentally, the disk drive apparatus is configured to allow the user to operate the operation portion 12 to input desired commands, however, a microcomputer may be provided with the disk read apparatus. Thus, the system controller 11 may be allowed to control the operation of the entire disk drive apparatus in accordance with commands supplied from the aforementioned microcomputer via an interface such as a SCSI (Small Computer System Interface), EIDE (Enhanced IDE), or ATAPI (AT Attachment Packet Interface).

The operation of the disk drive apparatus having such a configuration will now be described in accordance with flowcharts of FIGS. 4 and 5.

Figure 6:
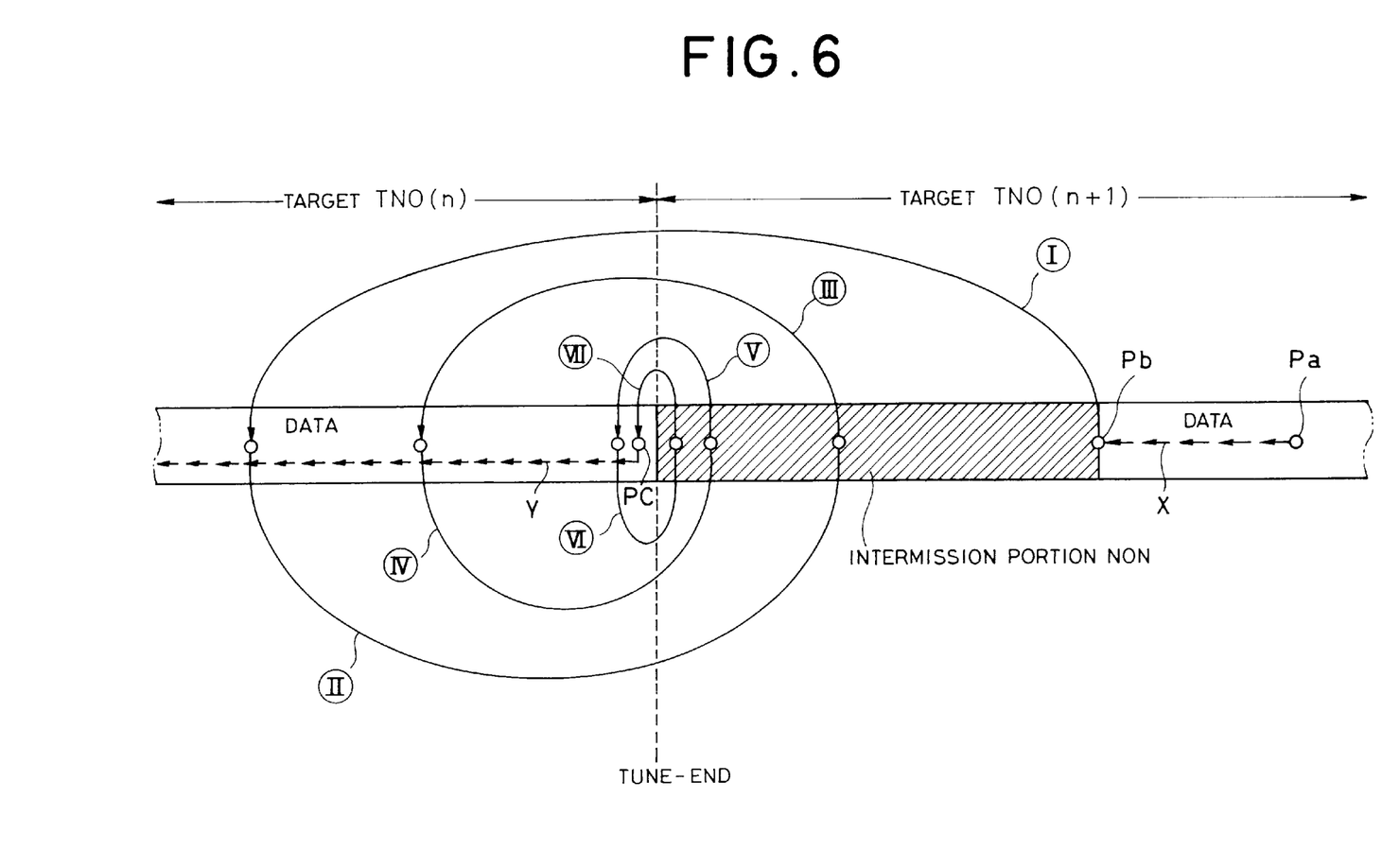
FIG. 6 is a schematic view illustrating the positional relationship between data written on a disk and a pickup, for the purpose of explaining the manual, search function of the disk drive apparatus according to an embodiment of the present invention.

Incidentally, a specific example is shown in FIG. 6 to facilitate the understanding of the operation. In the example, an explanation is given assuming the following. That is, the user loads, as disk 1 on the disk drive apparatus, a CD-R disk in the program area of which the user has written a plurality of pieces of tune data and on which the finalizing processing is performed. Then, the user inputs a command for starting manual search from the operation portion 12 in the course of reading the nth+1 tune data TNO(n+1). Thus, fast-reverse feeding is performed toward the nth tune data TNO(n).

In addition, as shown in FIG. 6, it is to be understood that the head area of the nth+1 tune data TNO(n+1) is an gap (no sound) area NON, and actual tune data is written subsequent to the gap (no sound) area NON. Moreover, each piece of tune data will be referred to as a target track number (TNO).

For example, shown in FIG. 6 above, suppose the user enters a command for starting manual search when the pickup 3 has moved to an address Pa in the course of reading the target track number TNO(n+1). In this case, the tracking servo is released to move the pickup 3 in the radial direction of the disk 1 by a predetermined number of tracks. Then, on-track servo of the pickup 3 is performed on the track to which the pickup 3 has moved to read one sector (98 frames) or a relatively small number of predetermined sectors from the recorded data. Then, the tracking servo is again released to move the pickup 3 in the radial direction of the disk 1. Thus, this processing is repeatedly performed to carry out the manual search. That is, manual search is performed by sequentially moving the pickup 3 in the radial direction as indicated by the plurality of arrows X of FIG. 6.

As described above, the user continues manual search to move the pickup 3 to the position of a start address Pb from which tune data has been actually recorded in the target track number TNO (n+1) shown in FIG. 6. Then, the process of tune-end search shown in FIG. 4 is initiated.

Incidentally, when index data contained in a P-channel sub-code outputted from the sub-code demodulator 10 becomes "1", the system controller 11 detects the arrival of the pickup 3 at the aforementioned start address Pb. Then, as shown in FIG. 2, the processing of "tune-end in search" is initiated.

Thus, suppose data is recorded on a CD-R disk with the CD-R recorder and subjected to finalizing processing. In this case, index data "0" is written as a P-channel sub-code or no index data is written for each sector onto the no-sound data of the gap portion (no sound) NON in each target track number TNO. In the head sector of the actual tune data, index data "1" indicating the beginning of the tune is recorded as the sub-code of the P-channel. In each of the sectors of the subsequent tunes, index data "2" is recorded as a P-channel sub-code.

Therefore, as described above, when the index data contained in the P-channel sub-code outputted from the sub-code demodulator 10 becomes "1", the system controller 11 detects the arrival of the pickup 3 at the start address Pb to initiate the "tune-end in search" processing shown in FIG. 4

In step S100, it is determined whether the pickup 3 is positioned at the last (end) address of a lead-out area LTNO of the disk 1.

That is, in accordance with a sub-code of a Q-channel outputted from the sub-code demodulator 10, the system controller 11 checks an absolute address (absolute time) of the data read by the pickup 3 to determine whether the absolute time is the last address of the lead-out area LTNO.

Here, if the absolute time is the last address (if "Yes"), control proceeds to step S102 where the absolute time of the lead-out is searched, and then control exits from the processing of manual search (step S104).

That is, FIG. 6 illustrates the case where the user performs manual search to perform fast-reverse feeding from the address Pa within the target track number TNO (n+1) toward the target track number TNO (n). When the user performs manual search to perform fast-forward feeding from the address Pa within the target track number TNO (n+1) toward the lead-out and the pickup 3 has arrived at the last address of the lead-out area LTNO, no more search processes are to be performed.

In the above step S100, if the absolute time is not the last address of the lead-out area LTNO (if "No"), control proceeds to step S106, where it is determined whether the pickup 3 is positioned within the program area of the disk 1. That is, the system controller 11 checks the sub-code of the Q-channel outputted from the sub-code demodulator 10. If the absolute time corresponds to the program area, control proceeds to step S108.

On the other hand, if the sub-code of the Q channel is not the absolute time indicating the program area (if "No"), control proceeds to step S112, where the pickup 3 is moved to the program area. That is, if the sub-code of the Q-channel is not an absolute time, the pickup 3 is pulled out of the lead-in area or lead-out area, where the pickup 3 is positioned, and is moved to the program area. Then, the processing is repeated from step S106.

Next, in step S108, it is determined whether the pickup 3 is positioned at the target track number TNO(n) of the jump target. That is, when an index data contained in the P-channel sub-code outputted from the sub-code demodulator 10 becomes "2", the system controller 11 determines that the pickup 3 is positioned at the target track number TNO(n) of the jump target, and then process proceeds to step S110. Otherwise (if "No"), control proceeds to step S114.

Next, in step S110, the system controller 11 checks whether a flag data FG indicating "tune-end in lock" to be described later has been set. If no "tune-end in lock" (if "No") has been set, control proceeds to step S122. If "tune end in lock" (if "Yes"), it is determined that the pickup 3 is positioned at the end of the target track number TNO (n) of the jump target or the terminal address (referred to as "tune-end address"). Here, the actual tune data of the target track number TNO(n) shown in FIG. 6 ends at the terminal address. Then, control exits from the processing of "tune-end search".

Then, the user may further continue manual search even after control has exited from the processing of "tune-end search". In this case, the pickup 3 is moved in the radial direction of the disk 1 following the aforementioned tune-end address of the target track number TNO(n), thereby allowing fast-reverse feeding to be performed subsequently.

As such, suppose that all the judgements in Steps S106, S108, and S110 are "Yes". In this case, manual search is initiated from the address Pa of the target track number TNO(n+1) shown in FIG. 6. Then, the pickup 3 is allowed to jump to the tune-end address of the target track number TNO(n) from the start address Pb (i.e., the front end address of tune data) of the actual tune data recorded. Thereafter, manual search is performed for the target track number TNO(n) following the tune-end address. That is, the manual search is to skip the gap (no sound) area NON to be performed only on the actual tune data of the target track number TNO(n+1) and the target track number TNO(n).

Now, an explanation is given to the processing taken in the case where the judgements are "No" in steps S108 and S110. That is, the processing for accurately moving the pickup 3 to the "tune-end address" of the target track number TNO(n) of the jump target will now be described.

In the above step S108, when it is determined that the pickup 3 has not moved from the address Pb to the target track number TNO(n) of the jump target, control proceeds to step S114. For example, suppose that after the pickup 3 has jumped toward the target track number TNO (n) and the gap (no sound) area is so long that the location to which it has jumped is within the area of the gap (no sound) area NON. In this case, it is determined to be "No" in step S108 and then control proceeds to step S114.

In step S114, it is checked which is greater or smaller, the target track number (current TNO) of the location to which the pickup 3 has actually jumped or the target track number (target TNO) over which it is supposed to jump. In addition, it is checked whether the number of jumps (the number of tracks) made by the pickup 3 has been set to one track.

Here, suppose the target TNO is smaller than the current TNO or the number of jumps has been set to one track (if "Yes"). Then, control proceeds to step S116, where the flag data FG indicating "tune-end in lock" is set to "1", and control proceeds to step S120 for performing the target track number search processing.

On the other hand, suppose that the target TNO is equal to or greater than the current TNO and the number of jumps (the number of tracks) has been set to a number larger than one track (if "No"). In this case, control proceeds to step S118, where the flag data FG indicating "tune-end in lock" is set to "0", thereby releasing the tune-end lock. Thereafter, control proceeds to the "target track number search processing" of step S120.

For example, suppose that the location to which the pickup 3 has jumped from the address Pb of the target track number (n+1) shown in FIG. 6 is located within the area of the gap (no sound) portion NON of the target track number TNO(n+1). In this case, the target TNO is smaller than the current TNO. When the position to which the pickup 3 has jumped from the address Pb of the target track number TNO(n+1) is located within the target track number TNO(n), the target TNO is equal to or greater than the current TNO.

In addition, as shown at I in FIG. 6, a relatively large number of tracks (300 tracks in this embodiment) are to be jumped upon making the first jump. At jumps following the first, the number of jumps is gradually decreased as shown at II to VI in the figure. Thus, when a jump is made immediately close to the tune-end address of the target track number TNO(n), the number of tracks made by the last jump is to be set to one track (1TRK).

These numbers of jumps (numbers of tracks) are preset in the system controller 11. The greatest preset number of jumps is set to level 1, the second greatest number of jumps is set to level 2, and in the same manner, the number of jumps is determined such that the smaller the number of jumps, the smaller the level.

Therefore, in step S114 described above, if the number of jumps is set to 1TRK and the target TNO is smaller than the current TNO, control proceeds to step S116. If the number of jumps is set to a number greater than 1TRK and the target TNO is equal to or greater than the current TNO, control proceeds to S118.

Next, in step S120, the "target track number search processing" is performed as shown in FIG. 5. First, in step S220, a number of jumps that is smaller by one level is selected. However, when the level has been already set to 1TRK, 1TRK is selected as it is. For example, as shown at I in FIG. 6, when the pickup 3 has moved by a great number of jumps, the number of jumps II corresponding to a next level is set.

Next, in step S202, the same processing is performed as that of the aforementioned step S114. That is, it is checked which is greater or smaller, the target track number (current TNO) of the location to which the pickup 3 has actually jumped or the target track number (target TNO) to which the pickup 3 is supposed to jump.

If the target TNO is smaller than the current TNO, control proceeds to step S204, where the pickup 3 makes a jump toward the inner periphery (in the lead-in direction) of the disk 1 by the number of jumps selected above.

On the other hand, if the target TNO is equal to or greater than the current TNO, control proceeds to step S206, where the pickup 3 makes a jump toward the outer periphery (in the lead-out direction) of the disk 1 by the number of jumps selected above.

Therefore, suppose the index data contained in a sub-code of P-channel is "1" after the jump has been made as shown at I in FIG. 6. In this case, a jump is to be made toward the outer periphery as shown at II in step S206. Suppose also that the gap (no sound) portion NON of the target track number TNO(n+1) is long and thus the jump target shown at I is within the portion of the gap (no sound) portion NON of the target track number TNO(n+1) (i.e., within the area of the gap (no sound) portion NON of the current TNO). In this case, it is determined that the index data contained in the sub-code of the P-channel is not "1". Then, through the processing in step S204, a jump is made in the direction of the inner periphery so that the pickup 3 moves closer to the target track number TNO(n).

When this "target track number search processing" has been completed, control performs processing again from step S106 shown in FIG. 4.

Now, an explanation is given of the case where the flag data FG of the "tune-end in lock" has not been set to "1" in step S110 and therefore control proceeds to step S122.

First, in step S122, it is determined whether the pickup 3 is moving toward the inner periphery of the disk 1, in accordance with the value of the index data contained in the sub-code of the P-channel. If true (if "Yes"), the number of jumps smaller by one level is selected in step S124, and thereafter the pickup 3 is caused to jump toward the outer periphery in step S126 by the selected number of jumps. Then, control repeats the processing from step S106.

On the other hand, in step S122, if the pickup 3 is moving toward the inner periphery (if "No"), control proceeds to step S126 directly, where the pickup 3 is caused to jump toward the outer periphery by the selected number of jumps. Then, control repeats the processing from step S106.

While the above steps S106, S108, S114 to S120, S110, and S122 to S126 are repeated, as shown at I–VI in FIG. 6, the pickup 3 moves back and forth across the tune-end address between the target track number TNO(n+1) to be jumped from and the target track number TNO(n) to be jumped to. In addition, the number of jumps decreases during the back and forth movement, so that the pickup 3 approaches gradually the tune-end address. Finally, the number of jumps of the pickup 3 is selected to the 1TRK, so that the pickup 3 makes a jump by 1TRK, as shown at VII, to arrive at a location Pc close to the tune-end address.

As described above, whether the pickup 3 arrived at the tune-end address is searched for, by checking the location of the jump target of the pickup 3 while the pickup 3 is being moved back and forth. This allows an error in the location Pc relative to the tune-end address in FIG. 6 to lie within the range of 1TRK. When the pickup 3 has arrived at the location Pc, the servo circuit 5 starts tracking servo operation, thereby placing the pickup 3 on the track of the tune-end address. Then, control exits from the processing of the "tune-end search".

In addition, suppose that the user further continues the manual search even after control has exited from the processing of the "tune-end search". In this case, the pickup 3 is moved in the radial direction of the disk 1 subsequently from the tune-end address of the target track number TNO (n) as indicated by a plurality of arrows Y in FIG. 6. The fast-reverse feeding is thereby performed continually.

Thus, take the manual search performed according to this embodiment on the disk 1 on which a plurality of track numbers TNO has been recorded. In this case, the search processing is adapted to continue through skipping from the start address (front-end address) of the actual tune data, recorded on the target track number to be jump from, to the tune-end address (rear-end address) of the target track number to be jumped to. Therefore, the user can search only for the actual tune data. This leads to solving conventional problems that it takes a long time to search for the read start position desired by the user and the manual search is also performed even on an gap (no sound) portion where no actual tune data is recorded. Thus, this makes it possible to provide improved operability.

In addition, suppose a writing error has occurred during recording tune data on a CD-R disk with a CD-R recorder and then manual search is performed on the disk 1 which contains a target track number corresponding to the writing error as read-protected data. Even in this case, the target track number corresponding to the writing error is not searched as well as the gap (no sound) portion NON shown in FIG. 6. For this reason, even with the disk 1 on which not only an gap (no sound) portion but also read-protected data has been written, the disk drive apparatus can provide improved operability without requiring unnecessary operations by the user.

Incidentally, while the disk drive apparatus has been described mainly as a read apparatus, the present invention can also be applied to a disk drive apparatus having a recording circuit for writing information onto a CD-R disk.

As described above, the present invention makes it possible to provide a disk drive apparatus which can provide improved operability without requiring unnecessary operations by the user. This has been achieved as follows. That is, the information recorded on the gap portion or the read-protected information is not searched but is skipped. This takes place when the information recorded on the inner and outer periphery of an information read/write medium is manually searched from the outer periphery across the information recorded on the gap portion or the read-protected information. Here, the information read/write medium has the information recorded on the gap portion or the read-protected information.

What is claimed is:

1. A disk drive apparatus having a manual search function, comprising:

detecting means for detecting a front end position of information recorded on an information read/write medium subsequent to a terminal end position of a gap portion of said information upon manual search of said information; and searching means for searching, during said manual search, for a terminal end position of information recorded on an opposite side of said gap portion, wherein said searching means skips said gap portion to move a pickup to said terminal end position to be searched for by said searching means when said detecting means detects said front end position during said manual search.

2. A disk drive apparatus as claimed in claim 1, wherein said manual search is performed by steps of jumping over a first predetermined range of a recording area in a searching direction, and reproducing data on a second predetermined range of the recording area, and repeating the steps of jumping and reproducing until a target address on recording tracks is reached.

3. A disc drive apparatus as claimed in claim 2, wherein said manual search is a rewind search operation in which data on said recording track is reproduced while the reading point of a pickup is moved towards the inner periphery of the recording area.

4. A disk drive apparatus having a manual search function, comprising:

detecting means for detecting a front end position of information recorded on an information read/write medium subsequent to a terminal end position of read-protected information of said information upon manual search of said information; and searching means for searching, during said manual search, for a terminal end position of information recorded on an opposite side of said read-protected information, wherein said searching means skips said read-protected information to move a pickup to said terminal end position to be searched for by said searching means when said detecting means detects said front end position during said manual search.

5. A disk drive apparatus as claimed in claim 4, wherein said manual search is performed by steps of jumping over a first predetermined range of a recording area in a searching direction, and reproducing data on a second predetermined range of the recording area, and repeating the steps of jumping and reproducing until a target address on recording tracks is reached.

6. A disc drive apparatus as claimed in claim 5, wherein said manual search is a rewind search operation in which data on said recording track is reproduced while the reading point of a pickup is moved towards the inner periphery of the recording area.

7. A disk drive apparatus having a manual search function, comprising:

a detector for detecting a front end position of information recorded on an information read/write medium subsequent to a terminal end position of a gap portion of said information upon manual search of said information; and a searching component for searching for a terminal end position of information recorded on an opposite side of said gap portion during said manual search, wherein said searching component skips said gap portion to move a pickup to said terminal end position to be searched for by said searching component when said detector detects said front end position during said manual search.

8. A disk drive apparatus as claimed in claim 7, wherein said manual search is performed by steps of jumping over a first predetermined range of a recording area in a searching direction, and reproducing data on a second predetermined range of the recording area, and repeating the steps of jumping and reproducing until a target address on recording tracks is reached.

9. A disc drive apparatus as claimed in claim 8, wherein said manual search is a rewind search operation in which data on said recording track is reproduced while the reading point of a pickup is moved towards the inner periphery of the recording area.

10. A disc drive apparatus as claimed in claim 9, wherein said detecting means sequentially performs the step of jumping, the step of reproducing, and a step of detecting a position of the pickup while repeating said jumping and reproducing steps, and wherein said searching means starts its operation after the pickup position has been detected by said detecting means, and performs an additional jump towards the inner periphery when a position reached by a jump is within a gap portion of the recording track.

11. A disc drive apparatus as claimed in claim 10, wherein said searching means performs a series of jumps respectively over ranges which decrease in order.

12. A disk drive apparatus having a manual search function, comprising:

a detector for detecting a front end position of information recorded on an information read/write medium subsequent to a terminal end position of read-protected information of said information upon manual search of said information; and a searching component for searching for a terminal end position of information recorded on an opposite side of said read-protected information during said manual search, wherein said searching component skips said read-protected information to move a pickup to said terminal end position to be searched for by said searching component when said detector detects said front end position during said manual search.

13. A disk drive apparatus as claimed in claim 12, wherein said manual search is performed by steps of jumping over a first predetermined range of a recording area in a searching direction, and reproducing data on a second predetermined range of the recording area, and repeating the steps of jumping and reproducing until a target address on recording tracks is reached.

14. A disc drive apparatus as claimed in claim 13, wherein said manual search is a rewind search operation in which data on said recording track is reproduced while the reading point of a pickup is moved towards the inner periphery of the recording area.

15. A method for performing a manual search function, comprising:

detecting a front end position of information recorded on an information read/write medium subsequent to a terminal end position of a gap portion of said information upon manual search of said information; and searching for a terminal end position of information recorded on an opposite side of said gap portion during said manual search, wherein said gap portion is skipped to move a pickup to said terminal end position to be searched for when said detector detects said front end position during said manual search, and wherein said manual searching includes:
jumping over a first predetermined range of a recording area in a searching direction,
reproducing data on a second predetermined range of the recording area, and
repeating the steps of jumping and reproducing until a target address on recording tracks is reached.

16. A method for performing a manual search function, comprising:

detecting a front end position of information recorded on an information read/write medium subsequent to a terminal end position of read-protected information of said information upon manual search of said information; and searching for a terminal end position of information recorded on an opposite side of said read-protected information during said manual search, wherein said read-protected information is skipped to move a pickup to said terminal end position to be searched for when said detector detects said front end position during said manual search, and wherein said manual search includes:
jumping over a first predetermined range of a recording area in a searching direction,
reproducing data on a second predetermined range of the recording area, and
repeating the steps of jumping and reproducing until a target address on recording tracks is reached.

* * * * *